US007133754B2

(12) United States Patent
Ishihara et al.

(10) Patent No.: US 7,133,754 B2
(45) Date of Patent: Nov. 7, 2006

(54) SYSTEM AND METHOD FOR USING AIRPORT INFORMATION BASED ON FLYING ENVIRONMENT

(75) Inventors: Yasuo Ishihara, Kirkland, WA (US); Steve C. Johnson, Issaquah, WA (US); Kevin J Conner, Kent, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/703,185

(22) Filed: Nov. 6, 2003

(65) Prior Publication Data

US 2004/0167684 A1 Aug. 26, 2004

Related U.S. Application Data

(60) Provisional application No. 60/425,044, filed on Nov. 8, 2002.

(51) Int. Cl.
*G06F 19/00* (2006.01)
*G06G 7/70* (2006.01)
*G01C 5/00* (2006.01)

(52) U.S. Cl. ........................ 701/15; 701/16; 701/14; 701/120; 701/9; 340/961

(58) Field of Classification Search .................. 701/15, 701/16, 14, 18, 120, 8, 9, 301; 340/945, 340/961, 970
See application file for complete search history.

(56) References Cited

U.S. PATENT DOCUMENTS

| | | | | |
|---|---|---|---|---|
| 5,548,515 | A | 8/1996 | Pilley et al. | |
| 5,839,080 | A * | 11/1998 | Muller et al. | 701/9 |
| 6,304,800 | B1 | 10/2001 | Ishihara et al. | |
| 6,591,170 | B1 * | 7/2003 | Block et al. | 701/9 |
| 6,826,459 | B1 * | 11/2004 | Conner et al. | 701/9 |

FOREIGN PATENT DOCUMENTS

| | | |
|---|---|---|
| DE | 19843799 | 3/2000 |

* cited by examiner

*Primary Examiner*—Thomas G. Black
*Assistant Examiner*—Brian J. Broadhead
(74) *Attorney, Agent, or Firm*—Black Lowe & Graham PLLC

(57) ABSTRACT

A method, system, and computer program product for using airport information based on the flying environment are provided. When a helicopter is determined to be approaching a runway, ground proximity warning envelopes are automatically reduced to prevent unwanted, or nuisance, terrain alerts. On the other hand, when a helicopter is flown near a runway without intent to land or when a helicopter is taking off, ground proximity warning envelopes may remain unchanged. As a result, nuisance alerts are reduced when a helicopter is approaching a runway for landing and ground proximity warnings may remain in effect to maximize protection when a helicopter is flying near a runway without an intent to land or is taking off from a runway.

69 Claims, 6 Drawing Sheets

SYSTEM AND METHOD FOR USING AIRPORT INFORMATION BASED ON FLYING ENVIRONMENT

PRIORITY CLAIM

This patent application claims priority from U.S. Provisional Patent Application Ser. No. 60/425,044 filed Nov. 8, 2002, and entitled "Method of Using Airport Information Based on the Flying Environment", the contents of which are hereby incorporated by reference.

FIELD OF THE INVENTION

The present invention relates generally to avionics and, more specifically, to helicopter avionics.

BACKGROUND OF THE INVENTION

Helicopters take off from and land at airports, as well as a multitude of off-airport sites. However, helicopters are often flown differently around airports than at other landing zones. This may be due to several reasons, including noise abatement or fixed-wing air traffic.

When a helicopter flies an instrument landing approach to an airport, the helicopter is typically flown like a fixed-wing aircraft; that is to say, a high speed is maintained until decision height (DH). Without knowing that the helicopter is flying an instrument approach at an airport, like a fixed-wing aircraft, a flight profile may be the same or similar to that of a typical controlled flight into terrain (CFIT) accident.

On the other hand, if the helicopter's pilot is not intending to land at the airport, then an Enhanced Ground Proximity Warning System (EGPWS) should warn the helicopter's pilot of the helicopter of a terrain alert situation. However, it is not known in prior art for a helicopter EGPWS to automatically make the decision of whether or not to use airport information (such as, airport location (latitude, longitude), elevation, and runway heading) to modulate EGPWS algorithms for avoiding nuisance alerts.

Therefore, there is an unmet need in the art for a helicopter EGPWS to automatically know when (and when not) to use airport information to modulate EGPWS algorithms. There is also an unmet need in the art for monitoring a takeoff of the helicopter from an airport differently than monitoring an approach by a helicopter to an airport.

SUMMARY OF THE INVENTION

Embodiments of the present invention provide methods, systems, and computer program products for using airport information based on the flying environment. When a helicopter is determined to be approaching a runway, ground proximity warning envelopes are automatically reduced to prevent unwanted, or nuisance, terrain alerts. On the other hand, when a helicopter is flying near a runway without intent to land, or when a helicopter is taking off, ground proximity warning envelopes may remain unchanged. As a result, nuisance alerts are reduced when a helicopter is approaching a runway for landing and ground proximity warnings may remain in effect to maximize protection when a helicopter is flying near a runway without intent to land or is taking off from a runway.

According to an exemplary embodiment of the present invention, airport information is used based on a flying environment. Space having a first volume is monitored in front of and below the helicopter. A determination is automatically made as to whether the helicopter is flying an approach to a runway. The monitored space is automatically modulated to a second volume in front of and below the helicopter that is smaller than the first volume when the helicopter is determined to be flying an approach to a runway.

According to another aspect of the present invention, the monitored volume of space ahead of and below the helicopter may become shorter and shallower when the helicopter is determined to be flying an approach to a runway. This is done to reduce nuisance alerts. The helicopter may be determined to be flying an approach to a runway when tracking of the helicopter is determined to be within a predetermined heading relative to a runway. Further, the helicopter may be determined to be flying an approach to a runway when the helicopter is determined to be within a predetermined distance of the runway.

According to another aspect of the present invention, monitored space is maintained at the first volume when the helicopter is determined not to be flying an approach to a runway. This is done to maximize safety. The helicopter may be determined not to be flying an approach to the runway when the helicopter is determined to be flying near a runway without intent to land on the runway. The helicopter may further be determined not to be flying an approach to the runway when the helicopter is determined to be taking off from a runway.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a method, system, and computer program product for using airport information based on the flying environment. When a helicopter is determined to be approaching a runway, ground proximity warning envelopes are automatically reduced to prevent unwanted, or nuisance, terrain alerts. However, when a helicopter is flown near a runway without intent to land, or when a helicopter is taking off, ground proximity warning envelopes may remain unchanged. As a result, nuisance alerts are reduced when a helicopter is approaching a runway for landing and ground proximity warnings may remain in effect to maximize safety when a helicopter is flying near a runway without intent to land or is taking off from a runway. Details of exemplary embodiments of the present invention are set forth below.

Figure 1:
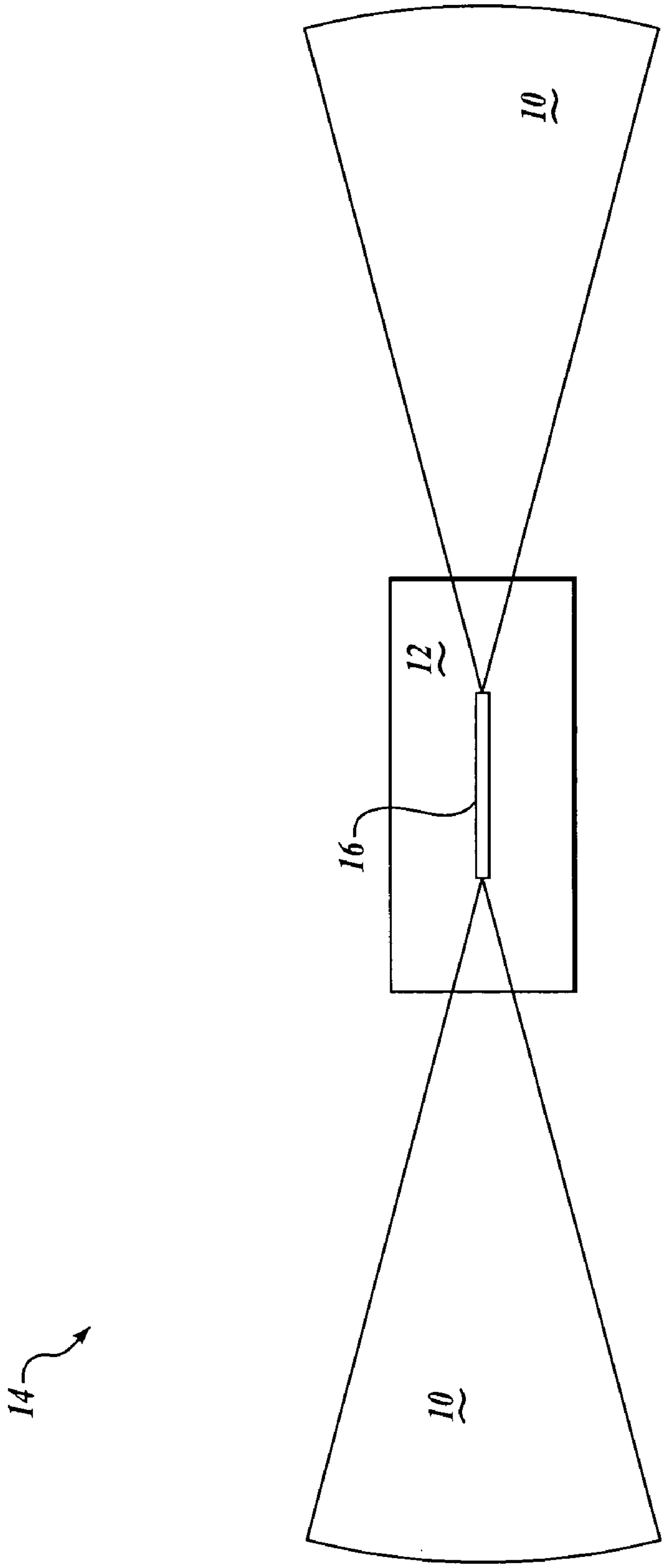
FIG. 1 illustrates a flying environment in a vicinity of an airport runway.

First, the flying environment of a helicopter in the context of the present invention is explained as follows. FIG. 1 is an overhead view of an airport and area around the airport. In FIG. 1, a helicopter (not shown) may operate in the air in one of three zones 10, 12, or 14. In the first zone 10, the helicopter is flying an approach to a runway 16. The approach may be an instrument approach, such as an Instrument Landing System (ILS) approach, a Global Positioning System (GPS) approach, or any other non-precision landing approach, or may be a visual flight rules (VFR) straight-in landing approach. Advantageously and according to embodiments of the present invention, when the helicopter is determined to be flying an approach to the runway 16, ground proximity warning envelopes are automatically reduced to prevent unwanted, or nuisance, terrain alerts.

In the second zone 12, the helicopter is operating in an airport environment and, specifically, may be operating in a runway environment. As is known, when a helicopter is operating in an airport environment or is landing in a runway environment, a helicopter may perform relatively extreme flying maneuvers, such as steep dives or steep banks. Because terrain alerts may distract a helicopter pilot during such extreme maneuvers, embodiments of the present invention advantageously disable terrain alerts when the helicopter is operating in the second zone 12.

In the third zone 14, the helicopter may be taking off or may be flying in the vicinity of an airport. As a result, it would be desirable for terrain warnings to be generated as expected. Advantageously, embodiments of the present invention maintain ground proximity warning envelopes in their normal flying configurations in order to generate terrain warnings as expected for this above-referenced circumstance.

Figure 2:
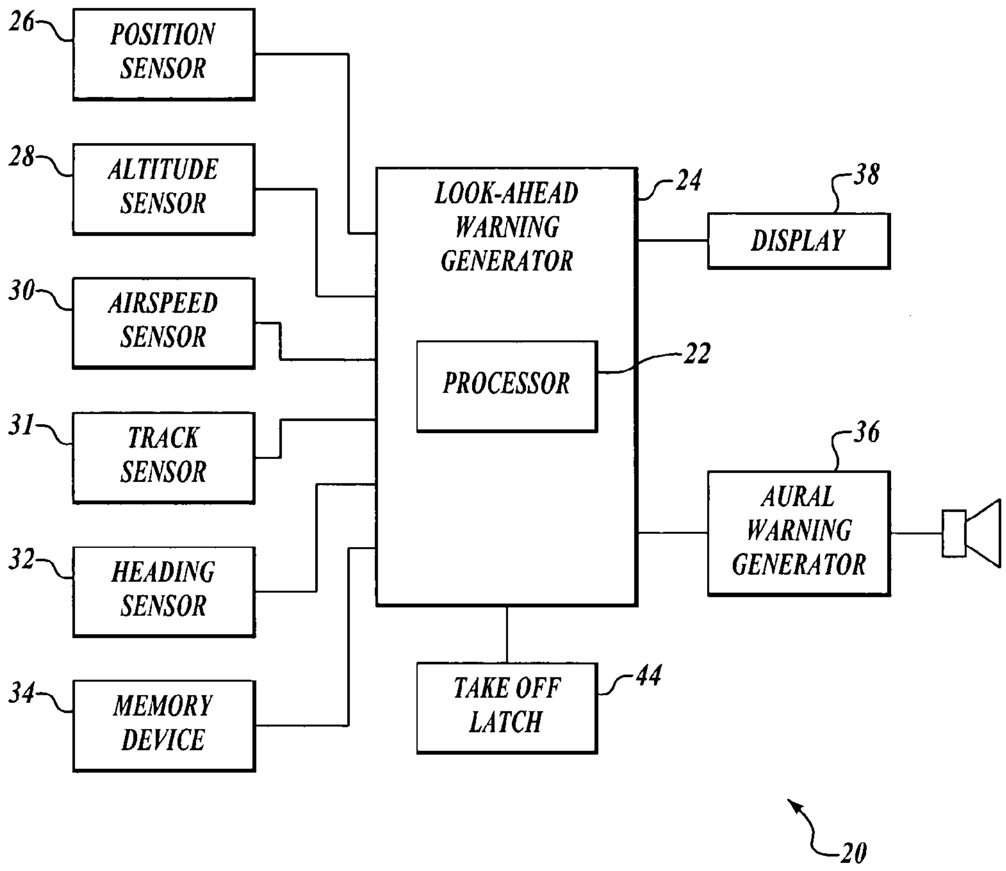
FIG. 2 is a block diagram of an exemplary system formed in accordance with an embodiment of the present invention.

Now that the flying environment of the helicopter in the context of the present invention has been explained, details of exemplary embodiments of the present invention are set forth as follows. Referring now to FIG. 2, an exemplary system 20 is configured to monitor space in front of and below a helicopter, and is also configured to automatically determine whether or not the helicopter is flying an approach to a runway. Advantageously and according to an embodiment of the present invention, the system 20 is also configured to automatically modulate the monitored space in front of and below the helicopter to a smaller volume of space when the helicopter is determined to be flying an approach to the runway.

As used herein, monitoring space in front of and below the helicopter refers to generating a look-ahead warning. First, the look-ahead aspect of the present invention is discussed. Generating a look-ahead warning is currently known in the art of avionics. For example, generation of a look-ahead warning is set forth in U.S. Pat. No. 6,304,800, the contents of which are hereby incorporated by reference. For sake of clarity, however, some details regarding generating a look-ahead warning are set forth below.

A look-ahead warning generator 24 analyzes terrain and aircraft data and generates terrain profiles surrounding the aircraft. The generator 24 includes a processor 22. The processor 22 may either be part of the generator 24, or may be a separate processor 22 located either internal or external to the generator 24. In one exemplary embodiment of the present invention, the processor 22 suitably is an Enhanced Ground Proximity Warning System (EGPWS) processor, available from Honeywell International, Inc. Details of an EGPWS processor are set forth in U.S. Pat. No. 5,839,080, the contents of which are hereby incorporated by reference. FIG. 2 depicts many of the components of the EGPWS of U.S. Pat. No. 5,839,080 in simplified block format for illustrative purposes. However, it is understood that the functions of these blocks are consistent with and contain many of the same components as the EGPWS described in U.S. Pat. No. 5,839,080.

The look-ahead warning generator 24 analyzes terrain and aircraft data, and generates terrain profiles surrounding the aircraft. Based on these terrain profiles and the position, track, and ground speed of the aircraft, the look-ahead warning generator 24 generates aural and/or visual warning alarms 36 related to the proximity of the aircraft to the surrounding terrain. Some of the sensors that provide the look-ahead warning generator 24 with data input concerning the aircraft are depicted in FIG. 2. Specifically, the look-ahead warning generator 24 receives positional data from a position sensor 26. The position sensor 26 may be a portion of a Global Positioning System (GPS), an Inertial Navigation System (INS), or a Flight Management System (FMS). The look-ahead warning generator 24 also receives altitude and groundspeed data from an altitude sensor 28 and groundspeed sensor 30, respectively, and aircraft track and heading information from track and heading sensors 31 and 32, respectively.

In addition to receiving aircraft data, the look-ahead warning generator 24 also receives data concerning the terrain surrounding the aircraft. Specifically, the look-ahead warning generator 24 is also connected to a memory device 34 that contains a searchable database of data relating to, among other things, the position and elevation of various terrain features and elevation, position, and quality information of runways.

In normal operation, the look-ahead warning generator 24 receives data concerning the aircraft from the various sensors (22, 28, 30, 31 and 32). Additionally, the look-ahead warning generator 24 accesses terrain and airport information from the memory device 34 concerning the terrain surrounding the aircraft and runways in close proximity to the aircraft's current position. Based on the current position, altitude, speed, track, etc. of the aircraft, the look-ahead warning generator 24 generates terrain warnings and caution envelopes and generates alerts via either an aural/visual warning generator 36 and/or a display 38 as to terrain data that penetrates the terrain warning and caution envelopes.

Advantageously, embodiments of the present invention also determine whether or not the helicopter is flying an approach to a runway. This runway selection feature is described in U.S. Pat. No. 6,304,800, the contents of which are hereby incorporated by reference. For sake of clarity, some details from U.S. Pat. No. 6,304,800 are included herein.

Still referring to FIG. 2, the processor 22 advantageously and automatically determines whether or not the helicopter is flying an approach to the runway. While all details regarding this determination are set forth in U.S. Pat. No. 6,304,800, pertinent details are set forth below. The processor 22 initially receives data from the various sensors 25, 28, 30, 31 or 32 pertaining to the aircraft. Additionally, the processor 22 also accesses the memory device 34 and obtains data relating to the runway. Using the aircraft and runway information, the processor 22 determines a reference angle deviation between the aircraft and the runway. Based on a reference angle deviation associated with the runway, the processor 22 automatically determines whether the aircraft is likely to land on the runway. Whether the aircraft intends to land on the runway may be determined based on the relationship of a position (i.e., latitude and longitude) of the aircraft in relation to the position of the runway, the direction in which the aircraft is flying in relation to the direction in which the runway extends, or the approach angle of the aircraft with relation to the runway location or a combination of these reference deviation angles.

In addition, the processor 22 may also determine whether or not the helicopter is flying an approach to the runway based on the angle deviation between the direction in which the aircraft is heading (i.e., track) and the direction in which the runway extends lengthwise. The processor 22 initially receives tracking information pertaining to the current heading of the aircraft from one or more of the various sensors 25, 28, 30, 31 or 32. Additionally, the processor 22 also accesses the memory device 34 and obtains information relating to the lengthwise extension of the runway. Using the aircraft and runway information, the processor 22 determines a track angle deviation between the aircraft and the runway. Based on the track angle deviation associated with a runway, the processor 22 automatically determines whether or not the helicopter is flying an approach to the runway.

In addition, the processor 22 may also determine whether or not the helicopter is flying an approach to the runway based on the approach angle of the aircraft. Typically, when landing, an aircraft will approach the runway within a predetermined range of angles, generally between 0° to approximately 7°. Approach angles above this range are typically considered unsafe for landing. As such, an aircraft that has a vertical angle with respect to the runway that is within the predetermined range of angles is more likely to land on the runway, and likewise, an aircraft that has a vertical angle with respect the runway that is greater than a predetermined range of angles is more likely not to land on a runway. The approach angle is usually referred to as glideslope and represents a vertical angle of deviation between the position of the aircraft and the runway.

Details for determining whether or not the helicopter is flying an approach to the runway based upon bearing, track angle, and glideslope are set forth in U.S. Pat. No. 6,304,800, the contents of which are hereby incorporated by reference. For sake of clarity, further details of this determination are not required for an understanding of the present invention.

Figure 5:
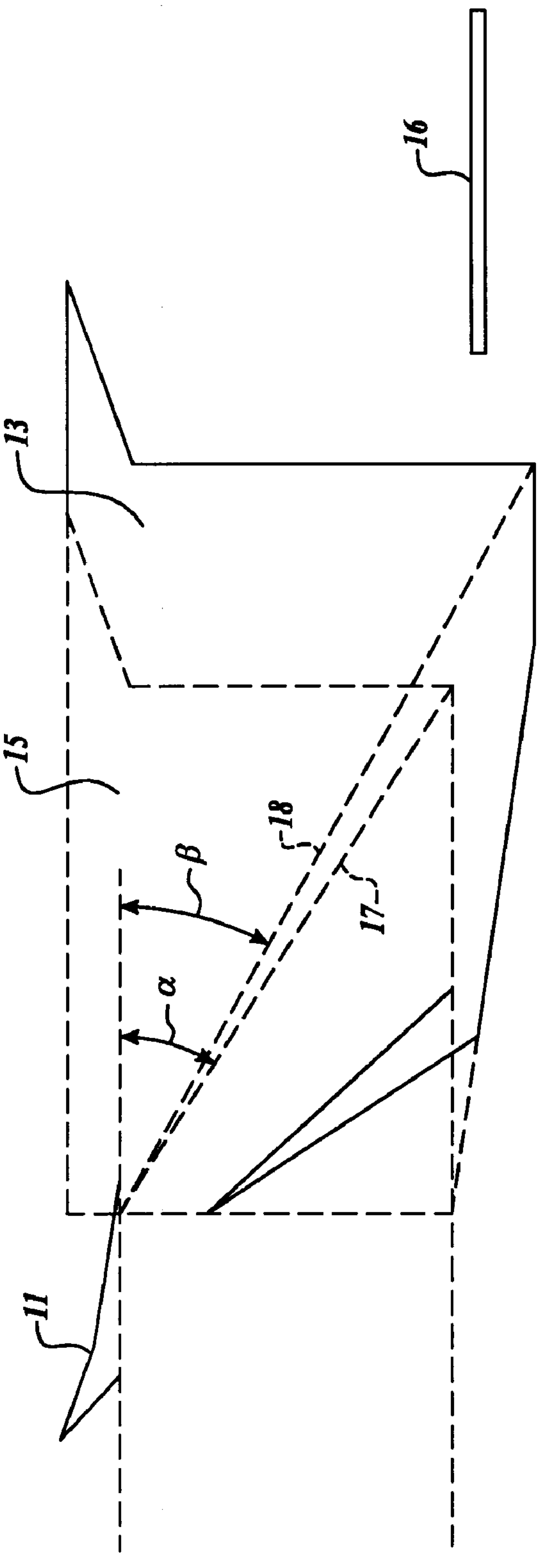
FIG. 5 is a side elevational view of the first and second warning envelopes in accordance with an embodiment of the present invention.

Referring to FIG. 5, as described above and according to embodiments of the present invention, the monitored space in front of and below the helicopter 11 is advantageously automatically modulated to a second volume 15 in front of and below the helicopter 11 extending along a first axis 17 at a first angle α that is smaller than a first volume 13 extending along a second axis 18 at a second angle β when the helicopter 11 is determined to be flying an approach to the runway 16. The look-ahead warning envelope is thus automatically modulated to a shorter and shallower look-ahead warning envelope. The warning envelope is modulated by desensitizing the EGPWS in order to prevent unwanted nuisance alarms during the landing procedure. Desensitizing the EGPWS to prevent unwanted nuisance alarms during landing is currently known in the art and is described in U.S. Pat. No. 5,839,080, which is hereby incorporated by reference. However, it will be appreciated that desensitizing the EGPWS may further entail modulating the look-ahead warning envelope from a first monitored space having a first volume 13 in front of and below the helicopter 11 that extends along a first length along a first axis in front of the helicopter 11 and at a first angle below the helicopter 11 to a shorter and shallower look-ahead warning envelope having a second volume 15 of monitored space in front of and below the helicopter 11 that extends along a second length that is shorter than the first length along a second axis in front of the helicopter 11 at a second angle below the helicopter 11 that is smaller than the first angle. For sake of clarity and brevity, it will be appreciated that further details of desensitizing the EGPWS to prevent unwanted nuisance alarms are not required for an understanding of the present invention.

Advantageously, embodiments of the present invention maintain the look-ahead warning envelope without desensitizing the EGPWS when the helicopter is not flying an approach to the runway. For example, when the helicopter is outside the exemplary limits discussed above for determining whether or not the helicopter is flying an approach to the runway, then the helicopter is determined not to be flying an approach to the runway and the look-ahead warning envelope is not modulated. Advantageously, if the helicopter is flying in the vicinity of the runway without intending to land on the runway, then the EGPWS provides terrain warnings according to normal operation.

Figure 6:
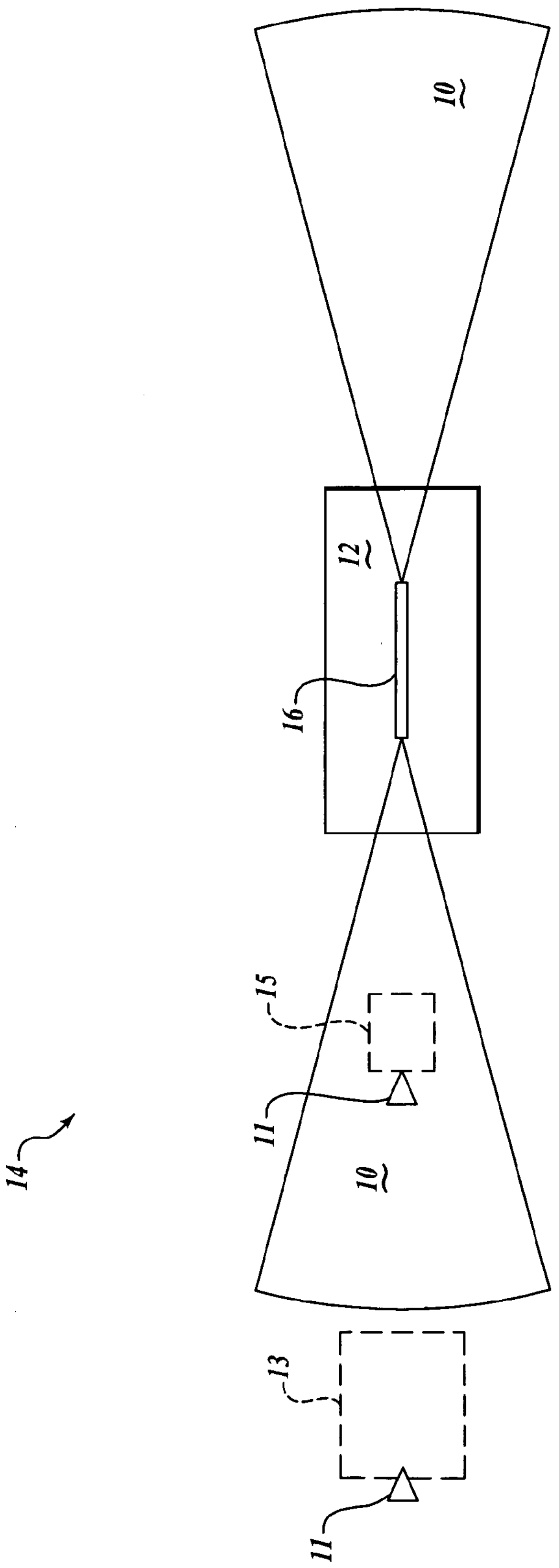
FIG. 6 is a planar view of the modulation of a first warning envelope to a second warning envelope when an aircraft is flying an approach to the runway in accordance with an embodiment of the present invention.

Referring now to FIG. 6, a helicopter 11 is flying an approach to the runway in zone 10. In zone 12, a helicopter 11 is operating in an airport environment, which may include a runway environment. In zone 14, a helicopter may be taking off or may be flying in the vicinity of an airport. The modulation of the first volume 13 to the second volume 15 may occur when a helicopter 11 is determined to be flying an approach to runway 16 in zone 10.

Alternately, the helicopter may be determined to not be flying an approach to the runway in response to information provided to the processor 22 from a flight management system (FMS) or a global positioning system (GPS). For example, the helicopter is not flying an approach to the runway when an "approach mode" is not selected by the FMS or the GPS. Also, an FMS flight plan may be used to determine whether or not the helicopter is flying an approach to the runway.

Figure 3:
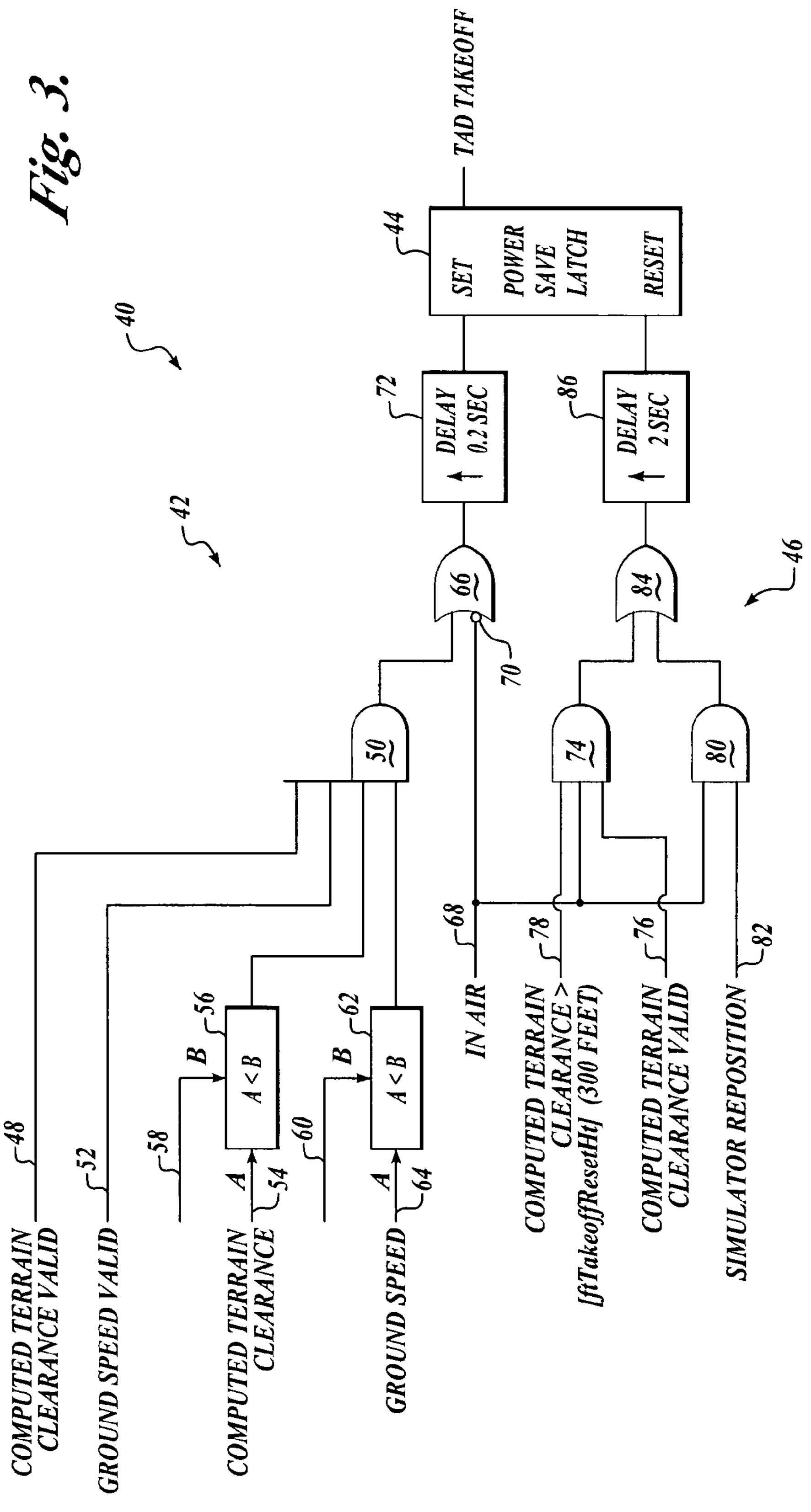
FIG. 3 is a logic diagram of processing performed according to an embodiment of the present invention.

Further, the helicopter is also not flying an approach to the runway when the helicopter is taking off. Referring now to FIG. 3, takeoff logic 40 determines when the helicopter is taking off. A branch 42 sets a latch 44 with a determination that the helicopter is taking off. Another branch 46 resets the latch 44 when the helicopter has cleared a predetermined height.

A signal 48 indicative of whether computed terrain clearance is valid is provided to an AND gate 50. In one embodiment of the present invention, the computed terrain clearance must be valid to be used by the logic 40. The signal 48 indicates that the computed terrain clearance is valid when parameters used to compute the computed terrain clearance are valid. A signal 52 indicative of whether ground speed is valid is also provided to the AND gate 50. In one embodiment of the present invention and similar to the computed terrain clearance described above, the ground speed must also be valid to be used by the logic 40. The signal 52 indicates that the ground speed is valid when parameters used to compute the ground speed are valid.

A signal 54 indicative of the computed terrain clearance is provided to a comparator 56. A signal 58 indicative of takeoff height is also provided to the comparator 56. Given by way of nonlimiting example, the takeoff height may have a value of approximately 100 ft. However, it will be appreciated that takeoff height may have any value as desired for a particular application. Output of the comparator 56 is provided to the AND gate 50. When the computed terrain clearance, indicated by the signal 54, is less than the takeoff height, indicated by the signal 58, then the comparator 56 outputs a logic one signal.

A signal 60 indicative of takeoff speed is provided to a comparator 62. Given by way of nonlimiting example, takeoff speed may have a value of approximately 40 knots. However, it will be appreciated that takeoff speed may have any value as desired for a particular application. A signal 64 indicative of ground speed is also provided to the comparator 62. Output of the comparator 62 is provided to the AND gate 50. When the ground speed, indicated by the signal 64, is less than the takeoff speed, indicated by the signal 60, then the comparator 62 outputs a logic one signal.

When all the inputs to the AND gate 50 are logic one signals, then the AND gate 50 outputs a logic one signal. That is, a determination is made that the helicopter is taking off. Output of the AND gate 50 is provided to an input terminal of an OR gate 66. A signal 68 indicative of whether the helicopter is in the air is provided to an inverting input 70 of the OR gate 66. Output of the OR gate 66 is provided to a delay block 72. The delay block 72 inserts a suitable time delay and provides the output from the OR gate 66 to a set terminal of the latch 44. The time delay inserted by the block 72 may have any value as desired for a particular application. In one exemplary embodiment of the present invention, the delay block 72 inserts a delay of around 0.2 seconds. When the delayed output of the OR gate 66 is provided to the set terminal of the latch 44, the latch 44 is set to a state indicative of the helicopter taking off.

The signal 68 is provided to an input of an AND gate 74. A signal 76 indicative of whether computed terrain clearance is valid is also provided to an input of the AND gate 74. Details of the signal 76 are the same as those set forth above regarding the signal 48. A signal 78 indicative of whether computed terrain clearance exceeds a predetermined takeoff reset height is also provided to an input of the AND gate 74. Given by way of nonlimiting example, the takeoff reset height may have a value of approximately 300 ft. However, it will be appreciated that the takeoff reset height may have any value as desired for a particular application. When the helicopter is in the air, the computed terrain clearance is valid, and the computed terrain clearance exceeds the takeoff reset height, as indicated by the signals 68, 76, and 78, respectively, then the AND gate 74 outputs a logic one signal to the OR gate 84.

The signal 68 is also provided to an input of an AND gate 80. A signal 82 indicative of simulator reposition is also provided to the AND gate 80. In one embodiment of the present invention, simulator reposition is a switch or Boolean that comes from a flight simulator when the simulator repositions the aircraft position (for example, starting a new simulation scenario). When the signals 68 and 82 are logic one signals, the AND gate 80 outputs a logic one signal. The output of the AND gate 74 and the output of the AND the gate 80 are provided to an and OR gate 84. Output of the OR gate 84 is provided to a delay block 86. The delay block 86 inserts a suitable time delay. Given by way of nonlimiting example, the time delay inserted by the delay block 86 may be around two seconds or so. However, it will be appreciated that the time delay inserted by the delay block 86 may have any value as desired for a particular application.

The output of the OR gate 84, delayed by the delay block 86, is provided to a reset terminal of the latch 44. Thus, the latch 44 is reset (that is, it is determined that the helicopter is no longer taking off) when the helicopter is in the air and has a gain in altitude in excess of the takeoff reset height. Alternately, the latch 44 may be reset when the helicopter is in the air and the simulator reposition signal 82 is activated.

Output of the takeoff latch 44 is provided to the generator 24 (FIG. 2). Advantageously and as a result, the generator 24 is provided with a determination that the helicopter is taking off. When the generator 24 is provided by the latch 44 with an indication that the helicopter is taking off, the processor 22 maintains the look-ahead warning envelopes per normal operation.

Figure 4:
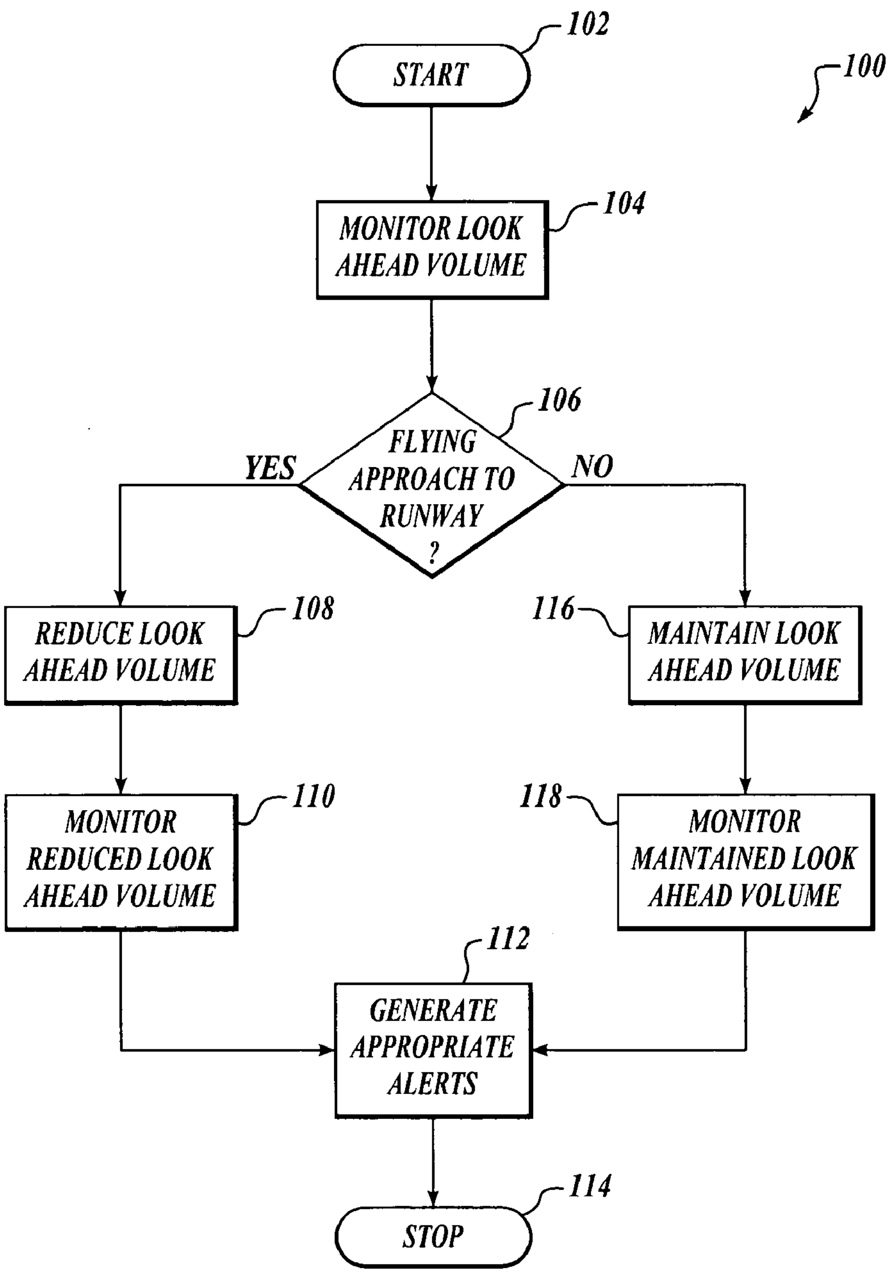
FIG. 4 is a flow chart of an exemplary method according to an embodiment of the present invention.

Referring now to FIG. 4, a method 100 for using airport information based on the flying environment begins at a block 102. Details of processing performed at blocks of the method 100 have been set forth above in discussions of FIGS. 1–3. It will be appreciated that processing to implement the method 100 suitably is implemented in software running on the processor 22 (FIG. 2).

At a block 104, look-ahead volume is monitored and look-ahead warning envelopes are generated per normal operation of an EGPWS. At a decision block 106, a determination is made as to whether the helicopter is flying an approach to a runway.

When determination is made that the helicopter is flying an approach to the runway, at a block 108 the look-ahead warning envelopes are reduced. The reduced look-ahead warning envelopes are monitored at a block 110. Appropriate terrain alerts are generated by the EGPWS according to the reduced look-ahead warning envelopes at a block 112. The method 100 ends at a block 114.

When a determination is made that the helicopter is not flying an approach to the runway, at a block 116 the look-ahead warning envelopes are maintained in their normal configurations. The normal look-ahead warning envelopes are monitored at a block 118. Appropriate terrain alerts are generated by the EGPWS according to the normal look-ahead warning envelopes at the block 112. The method 100 ends at a block 114.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A method of using airport information based on a flying environment, the method comprising:

monitoring space having a first volume in front of and below a helicopter;

automatically determining whether or not the helicopter is flying an approach to a runway; and automatically modulating the monitored space to a second volume in front of and below the helicopter that is smaller than the first volume when the helicopter is determined to be flying an approach to the runway, wherein:

the first volume extends along a first length along a first axis in front of the helicopter at a first angle below the helicopter; and the second volume extends along a second length that is shorter than the first length along a second axis in front of the helicopter at a second angle below the helicopter that is smaller than the first angle.

2. The method of claim 1, further comprising maintaining the monitored space at the first volume when the helicopter is determined not to be flying an approach to the runway.

3. The method of claim 2, wherein the helicopter is determined not to be flying an approach to the runway when the helicopter is determined to be flying near a runway without an intent to land on the runway.

4. The method of claim 3, wherein the helicopter is determined not to be flying an approach to the runway responsive to an indication from at least one of a flight management system and a global positioning system.

5. The method of claim 2, wherein the helicopter is determined not to be flying an approach to the runway when the helicopter is determined to be taking off from the runway.

6. The method of claim 5, wherein the helicopter is determined to be taking off when terrain clearance is less than a predetermined takeoff height and groundspeed is less than a predetermined takeoff speed.

7. The method of claim 1, wherein determining whether or not the helicopter is flying an approach to the runway further includes determining whether position of the helicopter is within a predetermined difference of position of the runway.

8. The method of claim 1, wherein determining whether or not the helicopter is flying an approach to the runway includes determining whether track angle of the helicopter is within a predetermined difference of a heading of the runway.

9. The method of claim 1, wherein determining whether or not the helicopter is flying an approach to the runway includes determining whether glideslope angle of the helicopter is within a predetermined difference of a predetermined glideslope angle.

10. A system for using airport information based on a flying environment, the system comprising:

a processor including:

a first component configured to monitor space having a first volume in front of and below a helicopter;

a second component configured to automatically determine whether or not the helicopter is flying an approach to a runway; and a third component configured to automatically modulate the monitored space to a second volume in front of and below the helicopter that is smaller than the first volume when the helicopter is determined to be flying an approach to the runway, wherein:

the first volume extends along a first length along a first axis in front of the helicopter at a first angle below the helicopter; and the second volume extends along a second length that is shorter than the first length along a second axis in front of the helicopter at a second angle below the helicopter that is smaller than the first angle.

11. The system of claim 10, wherein the second component determines that the helicopter is flying an approach to the runway when position of the helicopter is within a predetermined difference of position of the runway.

12. The system of claim 10, wherein the third component is further configured to maintain the monitored space at the first volume when the helicopter is determined not to be flying an approach to the runway.

13. The system of claim 12, wherein the second component determines that the helicopter is not flying an approach to the runway when the helicopter is flying near a runway without an intent to land on the runway.

14. The system of claim 13, wherein the second component determines that the helicopter is not flying an approach to the runway responsive to an indication from at least one of a flight management system and a global positioning system.

15. The system of claim 12, wherein the second component determines that the helicopter is not flying an approach to the runway when the helicopter is taking off from the runway.

16. The system of claim 15, wherein the second component determines that the helicopter is taking off when terrain clearance is less than a predetermined takeoff height and groundspeed is less than a predetermined takeoff speed.

17. The system of claim 10, wherein the second component determines that the helicopter is flying an approach to the runway when track angle of the helicopter is within a predetermined difference of a heading of the runway.

18. The system of claim 10, wherein the second component determines that the helicopter is flying an approach to the runway when glideslope angle of the helicopter is within a predetermined difference of a predetermined glideslope angle.

19. A computer program product residing on a computer-readable medium for using airport information based on a flying environment, the product comprising:

first computer program code means for monitoring space having a first volume in front of and below a helicopter;

second computer program code means for automatically determining whether or not the helicopter is flying an approach to a runway; and third computer program code means for automatically modulating the monitored space to a second volume in front of and below the helicopter that is smaller than the first volume when the helicopter is determined to be flying an approach to the runway, wherein:

the first volume extends along a first length along a first axis in front of the helicopter at a first angle below the helicopter; and the second volume extends along a second length that is shorter than the first length along a second axis in front of the helicopter at a second angle below the helicopter that is smaller than the first angle.

20. The computer program product of claim 19, wherein the second computer program code means is further configured to determine whether track angle of the helicopter is within a predetermined difference of a heading of the runway.

21. The computer program product of claim 19, wherein the second computer program code means is further configured to determine whether glideslope angle of the helicopter is within a predetermined difference of a predetermined glideslope angle.

22. The computer program product of claim 19, further comprising fourth computer program code means for maintaining the monitored space at the first volume when the helicopter is determined not to be flying an approach to the runway.

23. The computer program product of claim 22, wherein the second computer program code means determines the helicopter is not flying an approach to the runway when the helicopter is determined to be flying near a runway without an intent to land on the runway.

24. The computer program product of claim 23, wherein the second computer program code means determines the helicopter is not flying an approach to the runway responsive to an indication from at least one of a flight management system and a global positioning system.

25. The computer program product of claim 22, wherein the second computer program code means determines the helicopter is not flying an approach to the runway when the helicopter is determined to be taking off from the runway.

26. The computer program product of claim 25, wherein the second computer program code means determines that the helicopter is taking off when terrain clearance is less than a predetermined takeoff height and groundspeed is less than a predetermined takeoff speed.

27. The computer program product of claim 19, wherein the second computer program code means is further configured to determine whether position of the helicopter is within a predetermined difference of position of the runway.

28. A method of using airport information based on a flying environment, the method comprising:

monitoring space having a first volume in front of and below a helicopter, the first volume extending along a first length along a first axis in front of the helicopter at a first angle below the helicopter;

automatically determining whether or not the helicopter is flying an approach to a runway;

automatically modulating the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle; and maintaining the monitored space at the first volume when the helicopter is determined not to be flying an approach to the runway.

29. The method of claim 28, wherein determining whether the helicopter is flying an approach to the runway further includes determining whether position of the helicopter is within a predetermined difference of position of the runway.

30. The method of claim 28, wherein determining whether or not the helicopter is flying an approach to the runway includes determining whether track angle of the helicopter is within a predetermined difference of a heading of the runway.

31. The method of claim 28, wherein determining whether or not the helicopter is flying an approach to the runway includes determining whether glideslope angle of the helicopter is within a predetermined difference of a predetermined glideslope angle.

32. The method of claim 28, wherein the helicopter is determined not to be flying an approach to the runway when the helicopter is determined to be flying near a runway without an intent to land on the runway.

33. The method of claim 32, wherein the helicopter is determined not to be flying an approach to the runway responsive to an indication from at least one of a flight management system and a global positioning system.

34. The method of claim 28, wherein the helicopter is determined not to be flying an approach to the runway when the helicopter is determined to be taking off from the runway.

35. The method of claim 34, wherein the helicopter is determined to be taking off when terrain clearance is less than a predetermined takeoff height and groundspeed is less than a predetermined takeoff speed.

36. A system for using airport information based on a flying environment, the system comprising:

a processor including:

a first component configured to monitor space having a first volume in front of and below a helicopter, the first volume extending along a first length along a first axis in front of the helicopter at a first angle below the helicopter;

a second component configured to automatically determine whether or not the helicopter is flying an approach to a runway; and a third component configured to automatically modulate the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle, the third component being further configured to maintain the monitored space at the first volume when the helicopter is determined not to be flying an approach to the runway.

37. The system of claim 36, wherein the second component determines that the helicopter is flying an approach to the runway when position of the helicopter is within a predetermined difference of position of the runway.

38. The system of claim 36, wherein the second component determines that the helicopter is flying an approach to the runway when track angle of the helicopter is within a predetermined difference of a heading of the runway.

39. The system of claim 36, wherein the second component determines that the helicopter is flying an approach to the runway when glideslope angle of the helicopter is within a predetermined difference of a predetermined glideslope angle.

40. The system of claim 36, wherein the second component determines that the helicopter is not flying an approach to the runway when the helicopter is flying near a runway without an intent to land on the runway.

41. The system of claim 40, wherein the second component determines that the helicopter is not flying an approach to the runway responsive to an indication from at least one of a flight management system and a global positioning system.

42. The system of claim 36, wherein the second component determines that the helicopter is not flying an approach to the runway when the helicopter is taking off from the runway.

43. The system of claim 42, wherein the second component determines that the helicopter is taking off when terrain clearance is less than a predetermined takeoff height and groundspeed is less than a predetermined takeoff speed.

44. A computer program product for using airport information based on a flying environment, the method comprising:

first computer program code means for monitoring space having a first volume in front of and below a helicopter, the first volume extending along a first length along a first axis in front of the helicopter at a first angle below the helicopter;

second computer program code means for automatically determining whether or not the helicopter is flying an approach to a runway;

third computer program code means for automatically modulating the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle; and fourth computer program code means for maintaining the monitored space at the first volume when the helicopter is determined not to be flying an approach to the runway.

45. The computer program product of claim 44, wherein the second computer program code means is further configured to determine whether position of the helicopter is within a predetermined difference of position of the runway.

46. The computer program product of claim 44, wherein the second computer program code means is further configured to determine whether track angle of the helicopter is within a predetermined difference of a heading of the runway.

47. The computer program product of claim 44, wherein the second computer program code means is further configured to determine whether glideslope angle of the helicopter is within a predetermined difference of a predetermined glideslope angle.

48. The computer program product of claim 44, wherein the second computer program code means determines the helicopter is not flying an approach to the runway when the helicopter is determined to be flying near a runway without an intent to land on the runway.

49. The computer program product of claim 48, wherein the second computer program code means determines the helicopter is not flying an approach to the runway responsive to an indication from at least one of a flight management system and a global positioning system.

50. The computer program product of claim 44, wherein the second computer program code means determines the helicopter is not flying an approach to the runway when the helicopter is determined to be taking off from the runway.

51. The computer program product of claim 50, wherein the second computer program code means determines that the helicopter is taking off when terrain clearance is less than a predetermined takeoff height and groundspeed is less than a predetermined takeoff speed.

52. A method of using airport information based on a flying environment, the method comprising:

monitoring space having a first volume in front of and below a helicopter, the first volume extending along a first length along a first axis in front of the helicopter at a first angle below the helicopter;

automatically determining whether or not the helicopter is flying an approach to a runway, wherein the helicopter is determined not to be flying an approach to the runway when the helicopter is determined to be at least one of flying near a runway without an intent to land on the runway and taking off from the runway;

automatically modulating the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle; and maintaining the monitored space at the first volume when the helicopter is determined not to be flying an approach to the runway.

53. The method of claim 52, wherein determining whether or not the helicopter is flying an approach to the runway includes determining whether glideslope angle of the helicopter is within a predetermined difference of a predetermined glideslope angle.

54. The method of claim 52, wherein the helicopter is determined not to be flying an approach to the runway responsive to an indication from at least one of a flight management system and a global positioning system.

55. The method of claim 52, wherein the helicopter is determined to be taking off when terrain clearance is less than a predetermined takeoff height and groundspeed is less than a predetermined takeoff speed.

56. The method of claim 52, wherein determining whether the helicopter is flying an approach to the runway includes determining whether position of the helicopter is within a predetermined difference of position of the runway.

57. The method of claim 52, wherein determining whether the helicopter is flying an approach to the runway includes determining whether track angle of the helicopter is within a predetermined difference of a heading of the runway.

58. A system for using airport information based on a flying environment, the system comprising:

a processor including:

a first component configured to monitor space having a first volume in front of and below a helicopter, the first volume extending along a first length along a first axis in front of the helicopter at a first angle below the helicopter;

a second component configured to automatically determine whether or not the helicopter is flying an approach to a runway, wherein the second component determines that the helicopter is not flying an approach to the runway when the helicopter is at least one of flying near a runway without an intent to land on the runway and taking off from the runway; and a third component configured to automatically modulate the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle, the third component being further configured to maintain the monitored space at the first volume when the helicopter is determined not to be flying an approach to the runway.

59. The system of claim 58, wherein the second component determines that the helicopter is flying an approach to the runway when glideslope angle of the helicopter is within a predetermined difference of a predetermined glideslope angle.

60. The system of claim 58, wherein the second component determines that the helicopter is not flying an approach to the runway responsive to an indication from at least one of a flight management system and a global positioning system.

61. The system of claim 58, wherein the second component determines that the helicopter is taking off when terrain clearance is less than a predetermined takeoff height and groundspeed is less than a predetermined takeoff speed.

62. The system of claim 58, wherein the second component determines that the helicopter is flying an approach to the runway when position of the helicopter is within a predetermined difference of position of the runway.

63. The system of claim 58, wherein the second component determines that the helicopter is flying an approach to the runway when track angle of the helicopter is within a predetermined difference of a heading of the runway.

64. A computer program product for using airport information based on a flying environment, the method comprising:

first computer program code means for monitoring space having a first volume in front of and below a helicopter, the first volume extending along a first length along a first axis in front of the helicopter at a first angle below the helicopter;

second computer program code means for automatically determining whether or not the helicopter is flying an approach to a runway, the second computer program code means determining that the helicopter is not flying an approach to the runway when the helicopter is determined to be at least one of flying near a runway without an intent to land on the runway and taking off from the runway;

third computer program code means for automatically modulating the monitored space to a second volume in front of and below the helicopter that is smaller than the first volume when the helicopter is determined to be flying an approach to the runway, the second volume extending along a second length that is shorter than the first length along a second axis in front of the helicopter at a second angle below the helicopter that is smaller than the first angle; and fourth computer program code means for maintaining the monitored space at the first volume when the helicopter is determined not to be flying an approach to the runway.

65. The computer program product of claim 64, wherein the second computer program code means is further configured to determine whether glideslope angle of the helicopter is within a predetermined difference of a predetermined glideslope angle.

66. The computer program product of claim 64, wherein the second computer program code means determines the helicopter is not flying an approach to the runway responsive to an indication from at least one of a flight management system and a global positioning system.

67. The computer program product of claim 64, wherein the second computer program code means determines that the helicopter is taking off when terrain clearance is less than a predetermined takeoff height and groundspeed is less than a predetermined takeoff speed.

68. The computer program product of claim 64, wherein the second computer program code means is configured to determine whether position of the helicopter is within a predetermined difference of position of the runway.

69. The computer program product of claim 64, wherein the second computer program code means is further configured to determine whether track angle of the helicopter is within a predetermined difference of a heading of the runway.

* * * * *